(12) United States Patent
Kristiansen

(10) Patent No.: US 6,487,062 B1
(45) Date of Patent: Nov. 26, 2002

(54) RELAY CIRCUIT FOR CONTROLLING AN INDUCTIVE LOAD

(75) Inventor: Kjeld Kristiansen, Sønderborg (DK)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 09/256,111

(22) Filed: Feb. 24, 1999

(30) Foreign Application Priority Data

Feb. 27, 1998 (DK) .................................. 0267/98

(51) Int. Cl.⁷ .......................... H01H 9/00; H02H 5/04; H02H 3/00
(52) U.S. Cl. ........................ 361/189; 361/2; 361/23
(58) Field of Search .................... 361/2, 23, 3, 28, 361/143, 166, 189, 195; 307/112, 116, 125, 137, 138; 318/283, 281, 288

(56) References Cited

U.S. PATENT DOCUMENTS

| | | | |
|---|---|---|---|
| 3,976,927 A | * 8/1976 | Puschel et al. | ............. 318/368 |
| 5,229,695 A | * 7/1993 | Tsuda et al. | ................. 318/434 |
| 5,303,156 A | * 4/1994 | Matsuoka et al. | ............ 701/43 |
| 5,568,025 A | * 10/1996 | Sumida et al. | .............. 318/287 |

FOREIGN PATENT DOCUMENTS

| | | |
|---|---|---|
| DE | 3516985 A1 | 8/1986 |
| DE | 3811799 A1 | 10/1989 |

* cited by examiner

*Primary Examiner*—Kim Huynh
(74) *Attorney, Agent, or Firm*—Pitney, Hardin, Kipp & Szuch LLP

(57) ABSTRACT

An electric circuit is provided for an inductive load including a first relay and a second relay for connecting the inductive load with a power supply. Both relays are connected to the inductive load so as to be activated when the voltage drop across the inductive load is to be interrupted and/or inverted.

9 Claims, 1 Drawing Sheet

RELAY CIRCUIT FOR CONTROLLING AN INDUCTIVE LOAD

BACKGROUND OF THE INVENTION

Controls for linear actuators driven by electric motors frequently use electromechanical relays for the control of the coupling of the electric motors to a power supply. A typical control may e.g. take place between three main states, viz.: power supply interrupted with the motor short-circuited, rotation in one direction of rotation, and rotation in an opposite direction of rotation. Changes of these stationary states may e.g. be start and stop of the motor as well as reversing of the direction of rotation. It is well-known that the contact point in a relay is subjected to wear because of sparking when the current is turned on, and in particular when great currents are turned off. This stress on the contact has been found to be particularly pronounced in certain types of state changes in certain types of systems. For example, it has been found that a motor coupling, because of the inertia of the motor for a short or long period of time after a change in state, such as stopping or voltage inversion, provides a strong reactive voltage which apparently affects the performance of the relay and reduces the durability of the relay over time. Thus, it must be expected that relays for motor controls have an unreasonably short service life. Understandably, this service life is particularly difficult to handle in connection with encapsulated electronic circuits, since replacement of relays in such systems will involve relatively great costs.

In DE 3 811 799 and DE 3 516 985 a FET transistor is used in order to minimize the stress problem as described above. Before changing the state of the motor by changing the position of the relays, a FET transistor is used to deactivate the circuit. The circuit is deactivated until the motor has stopped whereupon the position of the relays and thereby the state of the motor can be changed.

This process can be quite time consuming since it is necessary to delay the change of motor state until the motor has slowed down in order to avoid unnecessary stress on the relays.

The object of the invention is to provide an electric circuit which obtains a considerably improved relay service life in operation.

SUMMARY OF THE INVENTION

In accordance with the present invention, an electric circuit is provided for an inductive load including a first relay and a second relay for connecting the inductive load with a power supply. Both relays are connected to the inductive load so as to be activated when the voltage drop across the inductive load is to be interrupted and or inverted.

A second electrically activatable relay which connects a first connecting point electrically to a second connecting point in a non-activated state and connects the first connecting point to a third connecting point in an activated state, an inductive load being coupled directly or via additional coupled electric components between the two first connecting points of the two relays so that the inductive load is connected to a power supply in given positions of the relays, said circuit being adapted to activate both relays when the voltage drop across the inductive load is to be interrupted and/or inverted, a remarkable improvement in the service life of the relays incorporated in the circuit and a high reliability in operation are achieved according to the invention.

It should be noted that an interruption of the voltage across a coupled motor is taken to mean an operation which is performed with the purpose of stopping the revolutions of the motor, while inversion of voltage supply is taken to mean an operation which is performed with the purpose of reversing the direction of rotation of coupled motors.

Irrespective of the final purpose of the operation, it will thus be appreciated that this is to be initiated by activating the relay system.

Surely, the explanation to the reason of this improvement is that the contact arms of the relays are retained better in their electrically activatable state to the connecting point in the relay, thereby avoiding strong spark discharges and strong mechanical impacts. Thus, according to the electric circuit of the invention, considerable mechanical destructive impacts on the relay arms are reduced, since these, instead of being subjected to bounce in a non-activated state, i.e. in an insufficiently purely mechanical "retention", are retained in a more controllable position in the electrically activated state.

After a given period of time, the major part of the energy generated by the electric motor, which serves as a generator for a short time after the change of state, will be dissipated in the electric circuit, i.e. in this case in the internal resistance of the motor, rather than in the mechanical contact assembly of the relays, following which the relays may be coupled, e.g. by deactivation, to the desired position, i.e. connected to the positive or negative terminal of the power supply.

Apart from the purely static considerations of the relays incorporated in the electric circuit, a greatly improved dynamic performance is achieved according to the invention, since the necessary switchings performed during the change of state take place under electrical activation of the relays rather than resilient mechanical deactivation. This means that the relay arms in the individual relays are forced against the contact point by a force from the control coil, ensuring that the bounce of the relay is minimized or avoided completely. Thus, the invention provides a well-defined switching to the contact point of the relay, as the bounce upon the impact on the contact point of the relay is minimized or avoided completely, as mentioned above. Correspondingly, deactivation of the relay coil results in contact bounce in the unenergized state of the contact assembly, caused by the oscillatory energy of the dynamic mass spring. As strong electric discharges across the contact point of the relay because of the bounce of the relay arm and a relatively high electric power given off by the motor during the braking of it are avoided, the service life of the relays used is prolonged noticeably. Pilot tests have thus shown that service life improvements of much more than a factor of 100 can be obtained.

It should moreover be noted that, in its generic embodiment, the invention may be used without supplementary current and voltage reducing measures, as the invention is precisely intended to ensure that the incorporated relays are capable of withstanding the voltages actually generated.

Thus, according to the invention, a substantially electric decoupling of inductive and electric energy is achieved altogether, so that the mechanical absorption of this electric energy in the relays may be reduced to a minimum.

The invention thus prevents the serious bounce which occurs particularly in connection with large motors which are used in linear actuators, as the repeated great sparking generated by the motor in the known systems is reduced, thereby considerably increasing the service life and reliability of the contacts. It has thus been found that, in addition to the longer service life achieved, the relays have a significantly improved service life up to break-down, if such occurs.

It should be noted in this context that the invention, in its basic form, does not take substantial measures toward reducing the combination of high voltage and current intensity generated by the motor, but more tends towards arranging the control of the relays in such a manner that these high voltages and current intensities do not cause damage to the contact points of the relay when the state is changed.

A further advantage of the invention is that the lapse of time during the change may be minimized, as the circuit of the invention does not require that the state of energy in the motor and the coupled mechanical system is reduced below a given value. This is an advantage particularly in connection with the braking of mechanical systems having a very low friction or inertia, since the system does not necessarily brake automatically upon the interruption of the power supply, but works mechanically toward a given end point. The invention thus enables such systems to be handled without problems, while ensuring that braking may take place under complete electric control.

The circuit is adapted to establish the interruption, the inversion or the correction after a certain delay by suitable control of the relays incorporated in the circuit, it is possible to perform switching to the unenergized contact point of the relays without this switching being superimposed by great powers generated by the motor during its braking.

In the given positions of the relays, the inductive load is connected to a power supply via at least one electrically controllable contact, preferably a FET transistor, which is interrupted by the deactivation of one or both relays after the activation of the relays, a particularly advantageous embodiment of the invention is achieved, since the supplementary interruption of the system from the power supply ensures that relay switching uncertainty does not result in unintentional connection to the power supply during the deactivation of the relays.

A typical combined control of relays and FET transistor or FET transistors will be implemented such that the FET electronics interrupts the connection to the power supply before relays, if any, are activated according to the invention.

Conversely, the connection of the FET electronics and thereby connection of the power supply will be established only when the relays have been set to the desired direction of rotation of a motor coupled to the circuit.

Several relay H-bridges may be connected in parallel for each FET transistor, just as the control may be performed with various control technologies, such as individual analogue control of each channel in a CB consisting of several channels, common analogue control of all channels in parallel or by means of a microprocessor control.

The relays of the circuit connect the motor to the negative terminal of the power supply in their non-activated state, a particularly advantageous use is achieved according to the invention, as the unenergized state thus does not require a power supply. The embodiment is thus particularly advantageous in connection with battery applications.

The system is coupled with an electric load instead of a decided inductive load, an increased service life of the relay-controlled systems is achieved according to the invention, if the loads generate voltage and current across the contacts of the relay even after the system has been cut off from the power supply.

BRIEF DESCRIPTION OF THE DRAWING

The accompanying FIGURE is a schematic representation for the electric circuit of the present invention.

DETAILED DESCRIPTION OF THE PREFERRED EMBODIMENT

Figure 1:
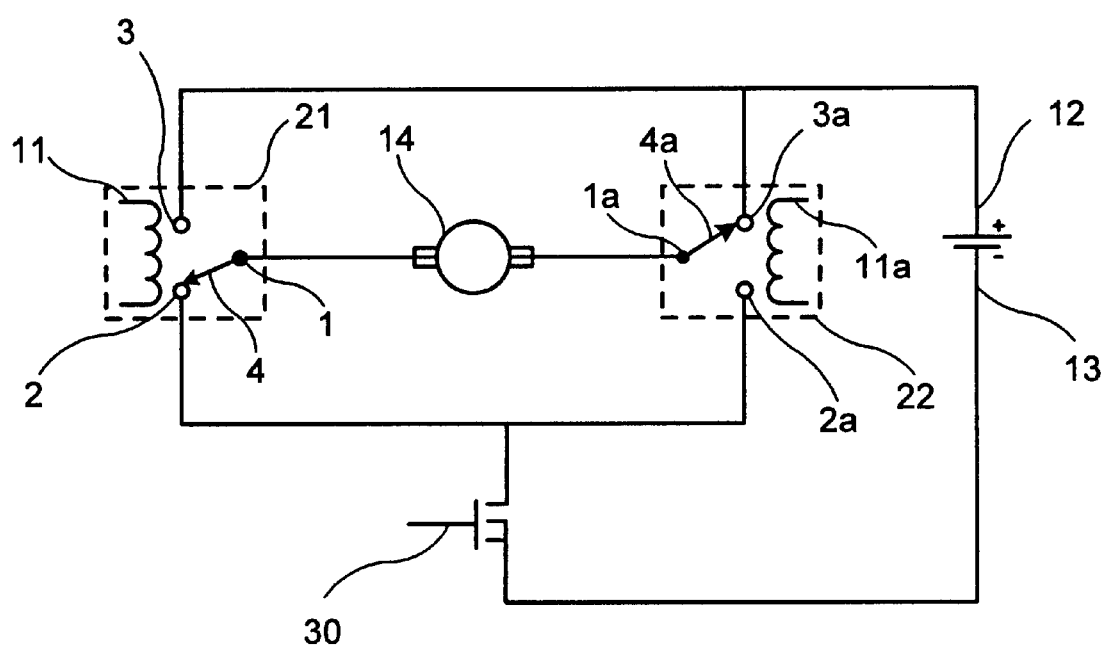

The accompanying drawing shows a diagram in which a motor 14 is controlled by means of two electromagnetic relays 21 and 22 which, by means of which, a first and second terminal of the motor 14 can be connected to the power supply 12 of the system. In the connection to the negative terminal 30 of the power supply there is a FET transistor 30. The motor 14 may e.g. be a permanent magnet DC communicator motor. In operation, the motor will be fed by the power supply 12, as will be described below, i.e. a power consuming mode. Immediately after an interruption of the power supply to the motor, the motor will operate as a generator when there is inertia in the motor or the mechanical system connected to the motor, i.e. a power generating mode. It should be noted that the motor thus generates power on the contact assembly of the relays 21 and 22.

Each relay 21, 22 comprises a mechanical relay arm 4, 4a which on one end is connected at points 1,1a respectively and on the other end is movable between two contact positions 2, 3 and 2a, 3a, respectively, under control. It also appears from the drawing that, according to the example, each relay arm 4, 4a is activated by a coil 11, 11a which, in its active state, i.e. when electric control current/voltage is applied to the coil, connects the connecting points 1 and 1a electrically to the connecting points 3 and 3a, respectively. In the non-activated state of the coil, the relay arm 4, 4a return to the contact position 2, 2a as said position which is exclusively maintained in accordance with the mechanical properties of the relay, such as spring force, inertia, etc. When the system is not operated the relays 21, 22 are in the non-activated state, i.e. with the relay arms 4,4a in position 2,2a and the FET transistor OFF. For running the motor in one direction, the relay 22 is activated causing the relay arm 4a to change position 3a. Accordingly, the relays are in position 2 and 3a, and further the FET transistor is ON connecting the motor 14 to the power supply 12, this causes, the motor to run in one direction.

Upon a change of state of the motor in the system shown the FET transistor is put in an OFF condition and, the relay 22 is actuated whereby the relay arm 4 is pulled to position 3, accordingly the current to the motor is cut off, while both relays are electrically activated, i.e. with the relay arm 4, 4a in position 3, 3a respectively.

As the motor 14, or the complete system in which the motor is coupled, has a certain inertia, the motor will serve as a power generator. The power generated will be disposed more or less directly over the contact points of the relays, for a short or long period after an interruption of the motor. These relatively great, and not always predictable voltages will according to the invention be coupled across the contacts in the relays 21, 22, in their actuated state, i.e. with the relay arm 4, 4a retained or switched under electric control to the positions 3, 3a. The contact points of the relays will therefore not give rise to bounce and accordingly not give rise to substantial destructive sparking in the contact points of the relay.

Subsequently, after a given delay, e.g. 50 ms, after a stop, both relays 21, 22 are deactivated. The mechanical properties of the relay will automatically return the relay arm 4, 4a to the position 2, 2a respectively, without the contact points being affected by major electric discharges by these switchings, as the energy of the motor 14 and of the system has been reduced or has disappeared at this time because of a full or partial braking of the system. It should be noted that the above-mentioned delay should be adapted to the individual application so that the motor 14 is without current when the relays 21, 22 are deactivated.

As a supplement to the embodiment described above, it is preferred that the FET transistor 30 is interrupted simultaneously with or immediately before the above-mentioned interruption of the motor 14. This supplementary interruption of the system by means of the FET transistor ensures that uncertainty with respect to the temporal control of the relays 21, 22 does not suddenly cause the motor 14 to be connected to power. This might occur e.g. if one relay 21, when returning to the non-activated state, is connected to the negative terminal 13 of the power supply before the other relay 22 has switched from its activated state.

A further possibility of adapting or improving the above-mentioned control for specific applications is to make a so-called soft stop.

This soft stop is performed by initially allowing the motor 14 to slacken its speed with interrupted FET transistor for e.g. 250 ms before the state of the relay is changed to motor braking, i.e. before the other relay 21 is switched to its activated state.

This combined control of the relays 21, 22 and the FET transistor 30 gives pronounced advantages in relation to applications where great combined voltages and currents across the relays 21, 22 occur, at the same time as these are to undergo a change of state.

If, however, a reversed direction of rotation should be desired, the operation is initiated as mentioned above, while the final deactivation of both relays is replaced by deactivation of the relay 22, following which the motor 14 is started with an opposite direction of rotation.

When the relays 21, 22 are subsequently in position 2a and 3, i.e. with the relay 21 in the activated state, the rotation of the motor is reversed relatively to the position described first.

In complete correspondence with the above description of the arrangement of the relay control upon an interruption, it is preferred that the FET transistor 30 is interrupted before or simultaneously with the above-mentioned interruption of the motor 14. It should be remembered in this connection that the response time of the relays is much longer than that of the FET which is interrupted immediately.

It should be noted that the embodiment shown is particularly advantageous in connection with battery applications, as the system is interrupted and connected to the negative terminal of the power supply in its unenergized state, i.e. with deactivated relays.

However, it should be stressed that the invention may also be implemented with inverted relays of course, i.e. where the relays are pulled actively to the negative terminal of the power supply, within the scope of the invention.

The shown preferred embodiment of the invention provides an improvement of the average service life of the relays incorporated in the motor relays of more than a factor of 100 relatively to the number of achievable switchings.

What is claimed is:

1. An electric circuit comprising an electrically activatable first relay (21) which connects a first connecting point (1) electrically to a second connecting point (2) in a non-activated state and connects the first connecting point (1) to a third connecting point (3) in an activated state, and a second electrically activatable relay (22) which connects a first connecting point (1a) electrically to a second connecting point (2a) in a non-activated state and connects the first connecting point (1a) to a third connecting point (3a) in an activated state, an inductive load, preferably one or more electric motors (14), being coupled between the two first connecting points (1) and (1a) so that the inductive load is connected to a power supply (12) in given positions of the relays (2, 3a; 3, 2a), said circuit being adapted to activate both relays (21, 22) when the voltage drop across the inductive load is to be interrupted or inverted.

2. An electric circuit according to claim 1, characterized in that circuit is adapted to establish the interruption or the inversion after a certain delay of the relays (21, 22).

3. An electric circuit according to claim 2, characterized in that, in the given positions of the relays (2, 3a; 3, 2a), the inductive load is connected to a power supply via at least one electrically controllable contact, being a FET transistor (30) which is interrupted upon deactivation of one or both relays (21, 22) after the activation of the relays (21, 22).

4. An electric circuit according to claims 1, characterized in that the relays (21, 22) connect the motor (14) to the negative terminal of the power supply in their non-activated state.

5. An electric circuit for controlling inductive loads, comprising an electrically activatable first relay (21) which connects a first connecting point (1) electrically to a second connecting point (2) in a non-activated state and connects the first connecting point (1) to a third connecting point (3) in an activated state, and a second electrically activatable relay (22) which connects a first connecting point (1a) electrically to a second connecting point (2a) in a non-activated state and connects the first connecting point (1a) to a third connecting point (3a) in an activated state, said circuit being adapted to be coupled to an inductive load between the two first connecting points (1) and (1a) so that the inductive load is connected to a power supply in given positions of the relays (2, 3a; 3, 2a), said circuit being adapted to activate both relays (21,22) when the voltage drop across a possibly coupled inductive load is to be interrupted and/or inverted.

6. An electric circuit comprising an electrically activatable first relay (21) which connects a first connecting point (1) electrically to a second connecting point (2) in a non-activated state and connects the first connecting point (1) to a third connecting point (3) in an activated state, and a second electrically activatable relay (22) which connects a first connecting point (1a) electrically to a second connecting point (2a) in an activated state and connects the first connecting point (1a) to a third connecting point (3a) in an activated state, an electric load being coupled between the two first connecting points (1) and (1a), so that the electrical load is connected to a power supply in given positions of the relays (2, 3a; 3, 2a), said circuit being adapted to activate both relays (21,22) when the voltage drop across the electric load is to be interrupted and/or inverted.

7. An electric circuit according to claim 6, characterized in that the circuit is adapted to establish the interruption, and/or inversion after a certain delay by suitable control of the relays incorporated in the circuit.

8. An electric circuit according to claim 6, characterized in that, in the given position of the relays (2, 3a; 3, 2a), the electric load is connected to a power supply via at least one electrically controllable switch which is interrupted simultaneous with or immediately before deactivation of one or both relays, (21, 22) after the activation of the relays (21, 22).

9. An electric circuit according to claims 6, characterized in that the relays (21,22) of the circuit connect the electric load to the negative terminal of the power supply in their non-activated state.

* * * * *